(12) United States Patent
Grove-Nielsen

(10) Patent No.: US 10,180,126 B2
(45) Date of Patent: Jan. 15, 2019

(54) WIND TURBINE ROTOR BLADE AND A METHOD FOR MOUNTING A WIND TURBINE ROTOR BLADE

(71) Applicant: SIEMENS AKTIENGESELLSCHAFT, München (DE)

(72) Inventor: Erik Grove-Nielsen, Roslev (DK)

(73) Assignee: SIEMENS AKTIENGESELLSCHAFT (DE)

( * ) Notice: Subject to any disclaimer, the term of this patent is extended or adjusted under 35 U.S.C. 154(b) by 354 days.

(21) Appl. No.: 15/057,256

(22) Filed: Mar. 1, 2016

(65) Prior Publication Data
US 2016/0258414 A1 Sep. 8, 2016

(30) Foreign Application Priority Data

Mar. 4, 2015 (EP) .................................... 15157571

(51) Int. Cl.
*F03D 1/06* (2006.01)
*F03D 13/10* (2016.01)

(52) U.S. Cl.
CPC ........... *F03D 1/0675* (2013.01); *F03D 13/10* (2016.05); *F05B 2240/302* (2013.01);
(Continued)

(58) Field of Classification Search
CPC .. F03D 1/0675; F03D 13/10; F05B 2240/302; F05B 2260/301
See application file for complete search history.

(56) References Cited

U.S. PATENT DOCUMENTS 8,167,569 B2 * 5/2012 Livingston ............ F03D 1/0675
416/1
9,051,917 B2 * 6/2015 Grabau ................. F03D 7/0228
(Continued)

FOREIGN PATENT DOCUMENTS

CN 101749181 A 6/2010
EP 1950414 A2 7/2008
(Continued)

OTHER PUBLICATIONS

Extended European Search Report for application No. 15157571.9, dated Aug. 13, 2015.
(Continued)

*Primary Examiner* — Ninh H. Nguyen
(74) *Attorney, Agent, or Firm* — Schmeiser, Olsen & Watts, LLP

(57) ABSTRACT

A wind turbine rotor blade, including a first blade section, a second blade section and at least one pre-stressed tensioning element for connecting the first blade section and the second blade section with each other, wherein the rotor blade is split at an interface thereof in a longitudinal direction into the first blade section and the second blade section, wherein the first blade section is arranged closer to a root of the rotor blade than the second blade section, wherein a length of the at least one pre-stressed tensioning element is larger than half of a chord length of the rotor blade at the interface and wherein the at least one pre-stressed tensioning element extends deeper into the first blade section than into the second blade section, is provided.

20 Claims, 5 Drawing Sheets

(52) U.S. Cl.
CPC . *F05B 2260/301* (2013.01); *F05B 2280/6003* (2013.01); *Y02E 10/721* (2013.01)

(56) References Cited

U.S. PATENT DOCUMENTS

| | | | | |
|---|---|---|---|---|
| 2007/0290118 | A1* | 12/2007 | Stiesdal | F03D 1/0675 248/544 |
| 2010/0143148 | A1 | 6/2010 | Chen et al. | |
| 2010/0158694 | A1 | 6/2010 | Stam et al. | |
| 2011/0091326 | A1* | 4/2011 | Hancock | F03D 1/0675 416/225 |
| 2011/0206510 | A1 | 8/2011 | Langen | |
| 2014/0079555 | A1* | 3/2014 | Seufert | F03D 1/0658 416/205 |
| 2014/0234116 | A1 | 8/2014 | Cussac | |
| 2015/0292477 | A1* | 10/2015 | Kratmann | F03D 1/0633 416/229 R |

FOREIGN PATENT DOCUMENTS

| | | |
|---|---|---|
| NL | 1 001 200 C2 | 3/1997 |
| WO | 2011067323 A2 | 6/2011 |
| WO | 2013083451 A1 | 6/2013 |

OTHER PUBLICATIONS

Chinese Office Action dated Oct. 26, 2018 for application No. 201610122811.8.

* cited by examiner

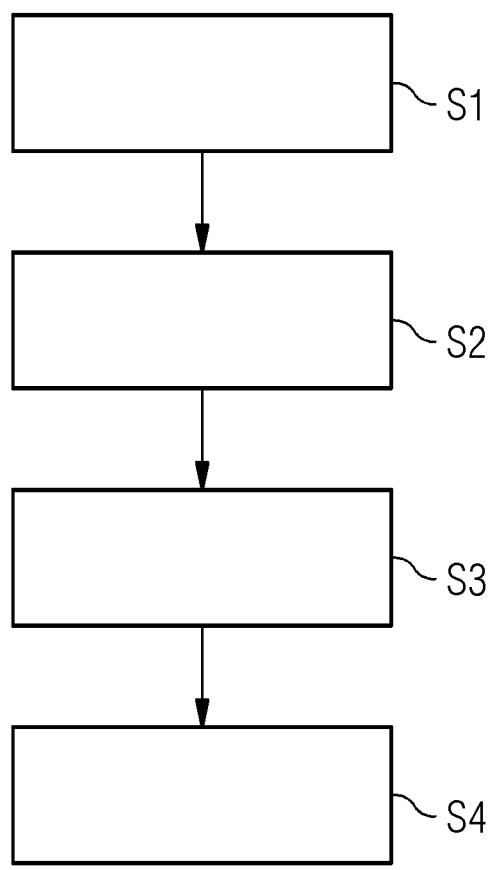

WIND TURBINE ROTOR BLADE AND A METHOD FOR MOUNTING A WIND TURBINE ROTOR BLADE

CROSS-REFERENCE TO RELATED APPLICATIONS

This application claims priority to European application No. EP 15157571.9 having a filing date of Mar. 4, 2015, the entire contents of which are hereby incorporated by reference.

FIELD OF TECHNOLOGY

The following relates to a wind turbine rotor blade and to a method for mounting a wind turbine rotor blade.

BACKGROUND

Modern wind turbine rotor blades are built from fiber-reinforced plastics such as glass fiber reinforced epoxy plastic or carbon fiber reinforced epoxy plastic. A rotor blade typically comprises an airfoil having a rounded leading edge and a sharp trailing edge. The rotor blade is connected with its blade root to a hub of the wind turbine. Such a rotor blade can be produced in the so-called vacuum assisted resin transfer molding technique, also named VARTM. A number of e.g. glass fiber fabrics are placed as a stack in a mold. The mold is closed, and evacuated to low pressure by means of a vacuum pump. Thereafter a liquid resin is infused into the laminate stack in the mold cavity and left to cure. After cure, the wind turbine blade can be taken out of the mold and then be finished.

As the need for non-fossil electricity production is rapidly growing, wind turbine blades grow dramatically in size. Blades exceeding 50 meter length poses an extreme challenge to road transportation. Thus, the need for splitting blades in two or more parts during transportation to the erection site seems to be necessary. In the near future blades exceeding 100 meter will be built and these blades are nearly impossible to transport in many public road systems. US 2010/0158694 A1 describes a rotor blade comprising a plurality of blade modules being connected to each other with fasteners.

SUMMARY

An aspect relates to improving a wind turbine rotor blade.

Accordingly, a wind turbine rotor blade comprising a first blade section, a second blade section and at least one pre-stressed tensioning element for connecting the first blade section and the second blade section with each other is provided, wherein the rotor blade is split at an interface thereof in its longitudinal direction into the first blade section and the second blade section, wherein the first blade section is arranged closer to a root of the rotor blade than the second blade section, wherein a length of the at least one pre-stressed tensioning element is larger than half of a chord length of the rotor blade at the interface and wherein the at least one pre-stressed tensioning element extends deeper into the first blade section than into the second blade section.

Due to the long pre-stressed tensioning element an everlasting pre-stressing of the interface of the rotor blade can be made. There is no need for later tightening of the pre-stresses tensioning element. As longer rotor blades can be produced and transported safely, reduced costs for the rotor blades can be expected. Lower cost of energy can be achieved.

In contrast to known split rotor blades in which the used fasteners are comparatively short and have to be checked often to ensure that the used fasteners do not develop fatigue cracks, using an ultra-long pre-stressed tensioning element reduces the fatigue load on the tensioning element. When the stretching of the material of the tensioning element takes place over a very long distance, a small length shift, for example a few millimeters, at the interface can be neglected. Service intervals can thus be 10 to 15 years. For short fasteners like steel bolts, the loss of a millimeter, for example due to loosening of the fasteners, will reduce the tension of the fasteners drastically and fatigue will develop.

The rotor blade may be denoted as split rotor blade. The first blade section may comprise the blade root. The first blade section may be denoted as root section, the second blade section may be denoted as tip section. The tensioning element extends in the longitudinal direction of the rotor blade. The rotor blade may have a length exceeding 100 meters. The rotor blade may have more than two blade sections, for example three or four. The at least one pre-stressed tensioning element is elastically stretched when mounting the rotor blade. The tensioning element is protruding from the first blade section and only protrudes a short distance past the interface into the second blade section. Background to this is that the shorter distance to a hub center of the wind turbine yields reduced bending moments from the gravitational forces acting on the tensioning element. The rotor blade has a leading edge and a trailing edge. The rotor blade has a chord line or chord. In aeronautics, the chord refers to an imaginary straight line joining the leading edge and the trailing edge of an aerofoil.

According to an embodiment, the length of the at least one pre-stressed tensioning element corresponds half times to five times the chord length, preferably once to four times the chord length, more preferably twice to three times the chord length. In particular, the length of the tensioning element can be twice the chord length.

According to a further embodiment, $6/10$, preferably $7/10$, more preferably $8/10$, more preferably $9/10$ of the length of the at least one pre-stressed tensioning element extends into the first blade section. Preferably, at least $6/10$ or at least 60%, more preferably at least $7/10$ or at least 70%, more preferably at least $8/10$ or at least 80%, more preferably at least $9/10$ or at least 90% of the length of the at least one pre-stressed tensioning element extends into the first blade section. This is to keep most of the mass of the tensioning element at closest possible distance from the blade root to reduce the bending moment from gravity induced to the blade root as the rotor blade rotates. In particular, in one exemplary embodiment of the rotor blade, $9/10$ of the length of the tensioning element extends into the first blade section and $1/10$ of the length extends into the second blade section.

According to a further embodiment, the at least one pre-stressed tensioning element comprises a carbon fiber reinforced material. The use of unidirectional carbon fiber laminate for the tensioning element reduces the weight of the rotor blade. Alternatively, the tensioning element may be made of steel.

According to a further embodiment, the at least one pre-stressed tensioning element comprises two fixing sections being provided at opposite ends thereof. Preferably, the tensioning element has a rod- or stud-shaped basic section. The fixing sections may have the form of steel cylinders being bonded to the carbon fiber reinforced material of the basic section. Each fixing section may have a bonding area being attached to the basic section, an area with a reduced diameter compared to a diameter of the bonding area and an external thread. The reduced diameter area has a reduced diameter for better fatigue properties of the fixing sections.

According to a further embodiment, the fixing sections comprise external threads. Alternatively, each fixing section may comprise an internal thread.

According to a further embodiment, the second blade section comprises a fixing member being embedded in fiber material of the second blade section, wherein the at least one pre-stressed tensioning element engages with the fixing member for connecting the first blade section and the second blade section with each other. The fixing member may be a so-called "carrot" which can also be used to connect the blade root the hub of the wind turbine. The fixing member may be embedded in fiber composite material of spar caps of the rotor blade. Forces from the tensioning element are transferred into the spar cap laminate via shear bonds. Alternatively, the fixing member may have a plate-shaped basic section being connectable to the tensioning element. The fixing member further may have force transmission plates that protrude perpendicular from the basic section. The force transmission plates preferably are provided with longitudinal grooves for an improved transmission of shear forces.

According to a further embodiment, the first blade section comprises a fixing device with an insert being embedded in fiber material of the first blade section and a removable nut, wherein the at least one pre-stressed tensioning element engages with the nut for connecting the first blade section and the second blade section with each other. The nut can be used to charge the tensioning element with a tensile force and to stretch the tensioning element.

According to a further embodiment, the at least one pre-stressed tensioning element is centrally arranged in a web of the rotor blade. No water can penetrate from the environment, as the tensioning element is placed inside a cavity of the rotor blade.

According to a further embodiment, the rotor blade comprises a plurality of pre-stressed tensioning elements. For example, the rotor blade may comprise four, twelve or twenty tensioning elements.

According to a further embodiment, the pre-stressed tensioning elements are arranged in indentations that are provided in spar caps of the rotor blade. Thus, no holes have to be drilled in the laminate prior to mounting the blade sections.

According to a further embodiment, the rotor blade comprises a sealing element being arranged between the first blade section and the second blade section. The sealing element is preferably made of an elastomeric material. Thus, a sealed, moisture safe connection of the blade sections can be made.

According to a further embodiment, the first blade section and/or the second blade section is provided with a notch for receiving the sealing element. Preferably, the notch is provided at an outside perimeter surface of a shell of the rotor blade.

According to a further embodiment, the at least one pre-stressed tensioning element is charged with a tensile force so that at the interface only compression forces act on shells of the blade sections. At the interface, the cross sectional area of the spar caps of the blade sections can be doubled to accept the bigger compressive load.

Further, a method for mounting a wind turbine rotor blade is provided. The method comprises the steps of:
a) providing a first blade section,
b) providing a second blade section, wherein the rotor blade is split at an interface thereof in its longitudinal direction into the first blade section and the second blade section and wherein the first blade section is arranged closer to a root of the rotor blade than the second blade section,
c) providing at least one tensioning element for connecting the first blade section and the second blade section with each other, wherein a length of the at least one tensioning element is larger than half of a chord length of the rotor blade at the interface, and
d) connecting the first blade section and the second blade section with each other by means of the at least one tensioning element, so that the at least one tensioning element is charged with a tensile force for pre-stressing it and so that the at least one tensioning element extends deeper into the first blade section than into the second blade section.

Preferably, during connecting the blade sections with each other, the tensioning element is stretched elastically.

"Wind turbine" presently refers to an apparatus converting the wind's kinetic energy into rotational energy, which may again be converted to electrical energy by the apparatus.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION

Some of the embodiments will be described in detail, with reference to the following figures, wherein like designations denote like members, wherein:

FIG. 12 shows a block diagram of a method for mounting a wind turbine rotor blade according to one embodiment.

DETAILED DESCRIPTION

Figure 1:
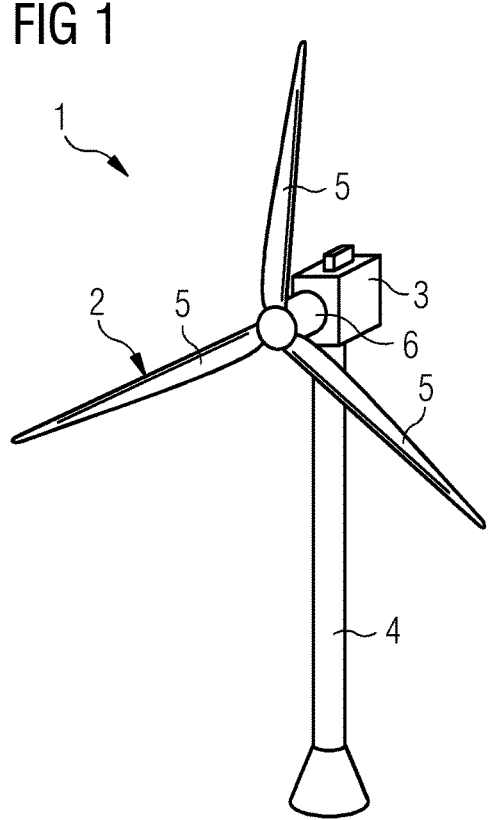
FIG. 1 shows a perspective view of a wind turbine according to one embodiment.

FIG. 1 shows a wind turbine 1 according to an embodiment.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises one, two or three rotor blades 5. The rotor blades 5 are connected to a hub 6 of the wind turbine 1. Rotors 2 of this kind may have diameters ranging from, for example, 30 to 160 meters or more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
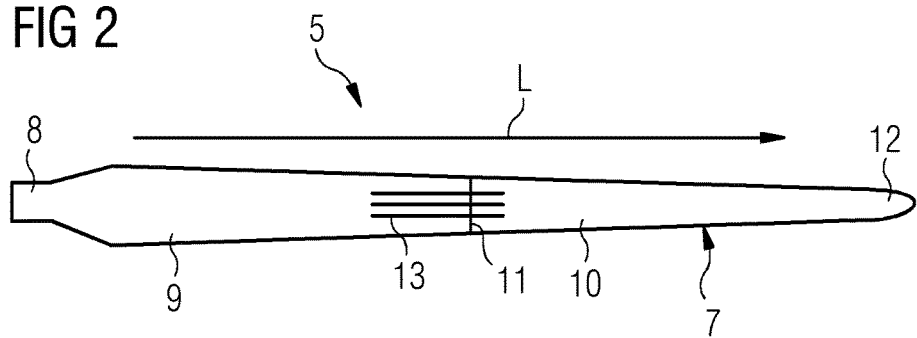
FIG. 2 shows a view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a rotor blade root 8 for connecting the rotor blade 5 to the hub 6. The rotor blade 5 may be fixed to the hub 6 by means of bolts.

The rotor blade 5 can be denoted as split rotor blade. The rotor blade 5 is split in its longitudinal direction L into a first blade section 9 and a second blade section 10. The rotor blade 5 may be split into more than two blade sections 9, 10. For example, the rotor blade 5 may be split into three, four or five blade sections 9, 10. The rotor blade 5 is split at an intersection or interface 11 thereof into the first blade section 9 and the second blade section 10. The interface 11 is positioned perpendicular to the longitudinal direction L. The first blade section 9 is arranged closer to the blade root 8 than the second blade section 10. The first blade section 9 may comprise the blade root 8. The first blade section 9 therefore may be denoted as root section. The second blade section 10 may comprise a tip 12 of the rotor blade 5. The second blade section 10 may therefore be denoted as tip section.

The rotor blade 5 further comprises at least one pre-stressed tensioning element 13. The number of tensioning elements 13 is arbitrarily. For example, the rotor blade 5 may comprise one, two, three, four and so on, tensioning elements 13. In the following, only one tensioning element 13 will be referred to. The tensioning element 13 extends in the longitudinal direction L of the rotor blade 5. The tensioning element 13 is pre-stressed with a tensile force so as to press together the blade sections 9, 10 at the interface 11. For this reason, only compression forces act on the interface 11. The tensioning element 13 is constructed to connect the first blade section 9 and the second blade section 10 with each other.

Figure 3:
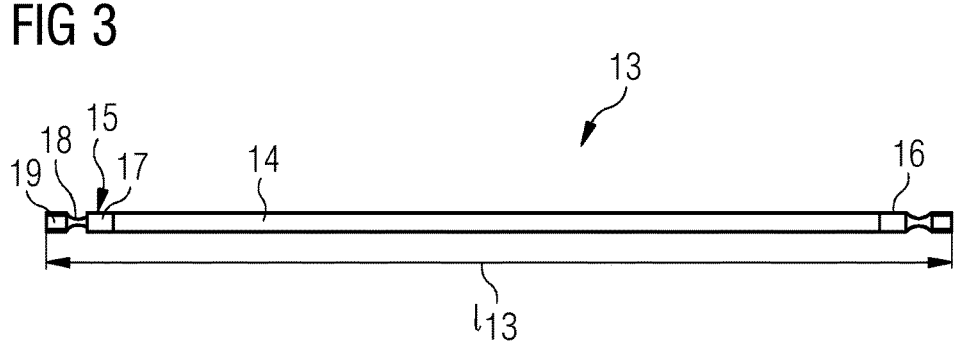
FIG. 3 shows a view of a tensioning element according to one embodiment.

FIG. 3 shows a tensioning element 13 according to one embodiment.

The tensioning element 13 has a rod- or stud-shaped basic section 14. The basic section 14 preferably comprises a carbon fiber reinforced material. Alternatively, the basic section 14 is made of steel. In particular, a unidirectional carbon fiber reinforced epoxy laminate is chosen as material for the basic section 14 because it has an E-modulus/weight ratio of 78 GPa/kg which is three times higher than the ratio of steel which is 25 GPa/kg and because it has a tensile strength/weight ratio of 2.285 MPa/kg which is 22 times higher than the ratio of steel which is typically 100 MPa/kg.

The tensioning element 13 further comprises two fixing sections 15, 16 being arranged at opposite ends thereof. The fixing sections 15, 16 may have the form of steel cylinders being bonded to the carbon fiber reinforced material of the basic section 14. Each fixing section 15, 16 has a bonding area 17 being attached to the basic section 14, a reduced diameter area 18 with a reduced diameter compared to a diameter of the bonding area 17 and an external thread 19. The area 18 has a reduced diameter for better fatigue properties of the threaded fixing sections 15, 16. The tensioning element 13 has a length $l_{13}$.

Figure 4:
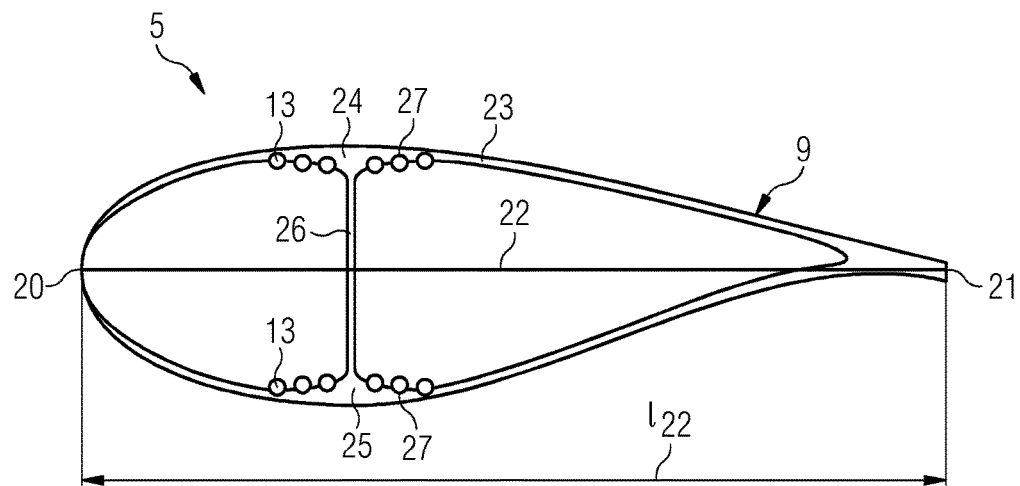
FIG. 4 shows a view of a wind turbine rotor blade according to one embodiment.

FIG. 4 shows a rotor blade 5 according to one embodiment.

FIG. 4 shows a view on the rotor blade 5 perpendicular to the interface 11. The rotor blade 5, the first blade section 9 or the second blade section 10 have a leading edge 20 and a trailing edge 21. The rotor blade 5 has a chord line or chord 22. In aeronautics, the chord 22 refers to an imaginary straight line joining the leading edge 20 and the trailing edge 21 of an aerofoil. At the interface 11, the chord 22 has a length $l_{22}$.

The length $l_{13}$ of the tensioning element 13 is larger than half of the chord length $l_{22}$ of the rotor blade 5 at the interface 11. As can be seen from FIG. 2, the tensioning element 13 extends deeper into the first blade section 9 than into the second blade section 10. Preferably, the length $l_{13}$ of the tensioning element 13 corresponds half times to five times the chord length $l_{22}$, preferably once to four times the chord length $l_{22}$, more preferably twice to three times the chord length $l_{22}$. For example, the length $l_{13}$ of the tensioning element 13 may be twice the chord length $l_{22}$ of the rotor blade 5 at the interface 11.

The tensioning element 13 is placed mainly in the first blade section 9 and projects only shortly into the second blade section 10. Background for this is that the shorter distance to a center of the hub 6 yields in reduced bending moments from the gravitational forces acting on the tensioning element 13. In particular, 6/10, preferably 7/10, more preferably 8/10, more preferably 9/10 of the length $l_{13}$ of the tensioning element 13 extends into the first blade section 9.

As can be seen from FIG. 4 the rotor blade 5 has a shell 23 made of fiber reinforced plastic material. Each blade section 9, 10 has a shell 23. Spar caps 24, 25 are reinforcing the shell 23. The spar caps 24, 25 are connected to each other by a structural web 26. The spar caps 24, 25 and the web 26 are also made of fiber reinforced plastic material. The rotor blade 5 comprises a plurality of tensioning elements 13 of which only two are denoted with a reference sign. For example, twelve tensioning elements 13 can be provided. The tensioning elements 13 are placed in wave-shaped indentations 27 being arranged on an inside of the spar caps 24, 25.

Figure 5:
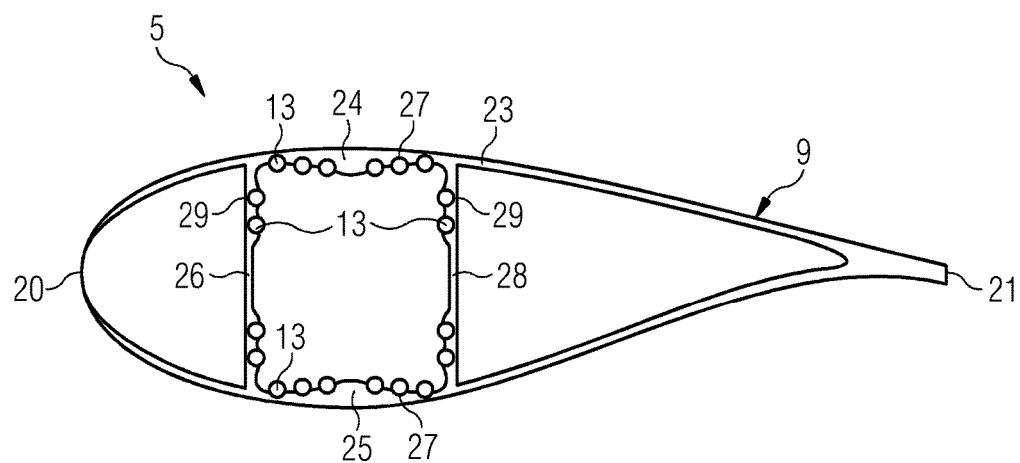
FIG. 5 shows a view of a wind turbine rotor blade according to one embodiment.

FIG. 5 shows a rotor blade 5 according to one embodiment.

FIG. 5 shows a view on the rotor blade 5 perpendicular to the interface 11. The rotor blade 5 according to FIG. 5 differs from the rotor blade 5 according to FIG. 4 mainly in that it has two webs 26, 28. The webs 26, 28 and the spar caps 24, 25 constitute a box-shaped geometry. The number of tensioning elements 13 is increased. The rotor blade 5 is provided with twenty tensioning elements 13 of which only four are provided with reference signs. The webs 26, 28 are provided with wave-shaped indentations 29 for the tensioning elements 13 being arranged on an inside of the webs 26, 28. The rotor blade 5 according to FIG. 5 has an improved edgewise load capacity.

Figure 6:
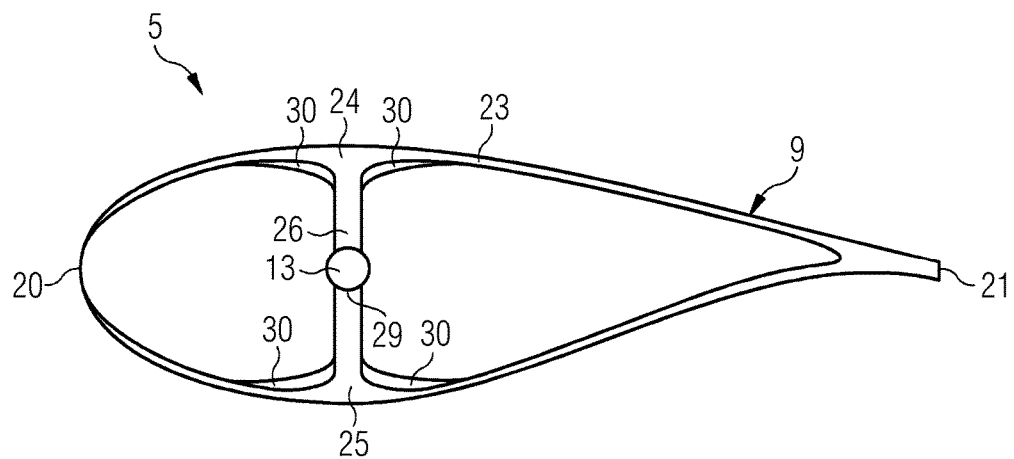
FIG. 6 shows a view of a wind turbine rotor blade according to one embodiment.

FIG. 6 shows a rotor blade 5 according to one embodiment.

FIG. 6 shows a view on the rotor blade 5 perpendicular to the interface 11. The rotor blade 5 according to FIG. 6 differs from the rotor blade 5 according to FIG. 4 mainly in that it has only one centrally arranged tensioning element 13. In the case of only one central tensioning element 13—placed in or around the central web 26—the shell 23 at the interface 11 will only transfer compression forces. At the interface 11, a cross sectional area of the spar caps 24, 25 will be doubled, to accept the bigger compressive load. Preferably, the tensioning element 13 is arranged centrally in the web 26. The web 26 is reinforced compared to the rotor blade 5 according to FIG. 4. An indentation 29 is provided centrally in the web 26 for receiving the tensioning element 13. The spar caps 24, 25 are reinforced at the interface 11 with laminate thickeners 30 which allow increased compressive forces at the interface 11. The tensioning element 13 is charged with a tensile force so that at the interface 11 only compression forces act on the shells 23 of the blade sections 9, 10.

Figure 7:
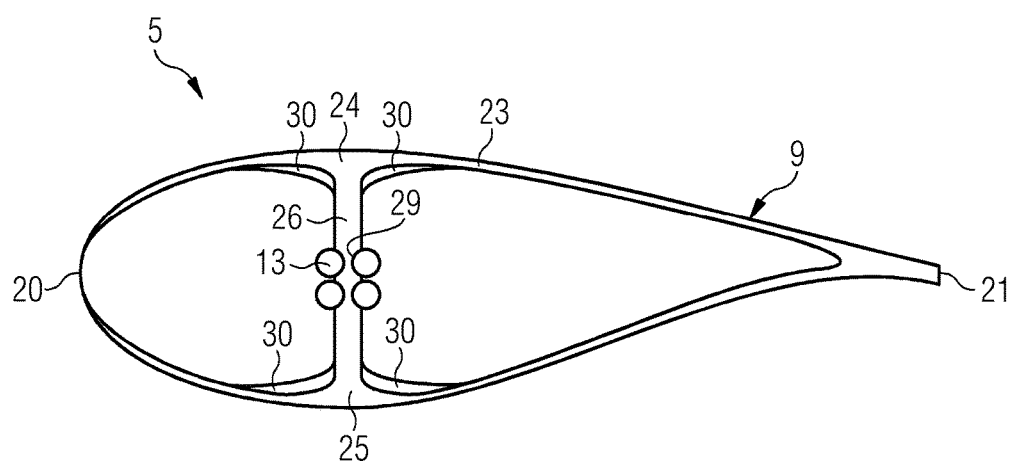
FIG. 7 shows a view of a wind turbine rotor blade according to one embodiment.

FIG. 7 shows a rotor blade 5 according to one embodiment.

FIG. 7 shows a view on the rotor blade 5 perpendicular to the interface 11. The rotor blade 5 according to FIG. 7 differs from the rotor blade 5 according to FIG. 6 in that it has four centrally arranged tensioning elements 13 instead of one.

Figure 8:
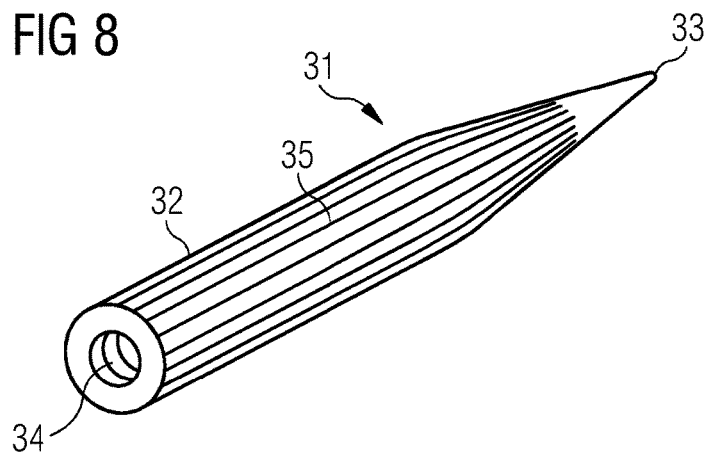
FIG. 8 shows a perspective view of a fixing member according to one embodiment.

FIG. 8 shows a fixing member 31 according to one embodiment.

The fixing member 31 is embedded in the fiber material of the spar caps 24, 25 of the second blade section 10. The number of fixing members 31 is equal to the number of tensioning elements 13. Forces from the tensioning elements 13 are transferred to the spar cap laminate via shear bonds. The fixing member 31 is glued or directly bonded by infused resin in carbon or glass fiber layer into the spar caps 24, 25. The second blade section 10 comprises at least one fixing member 31 being embedded in fiber material of the second blade section 10, wherein the at least one tensioning element 13 engages with the fixing member 31 for connecting the first blade section 9 and the second blade section 10 with each other.

The fixing member 31 can be a so-called "carrot" which may also used to fix the blade root 8 to the hub 6 of the wind turbine 1. The fixing member 31 is preferably made of metal. The fixing member 31 has a cylindrical body 32 that reduces to a pointed tip 33. The body 32 has a flat front face. Centrally in the body 32 is arranged an internal thread 34 that matches the thread 19 of the tensioning element 13. The body 32 has longitudinal grooves 35 which enlarge an outer surface of the fixing member 31 which in turn improves the shear force transmission.

Figure 9:
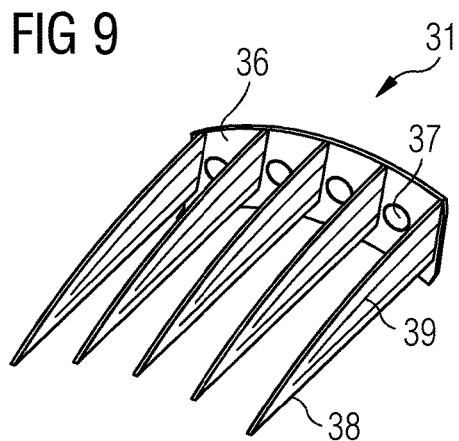
FIG. 9 shows a perspective view of a fixing member according to one embodiment.

FIG. 9 shows a fixing member 31 according to one embodiment.

The fixing member 31 is preferably made of steel. The fixing member 31 has a plate-shaped basic section 36 being provided with holes 37 for the tensioning elements 13. The holes 37 may be provided with threads for engaging the threads 19 of the tensioning elements 13. Alternatively, nuts may be used to fix the tensioning elements 13 to the fixing member 31. The fixing member 31 further has force transmission plates 38 that protrude perpendicular from the basic section 36. For example, five force transmission plates 38 are provided of which only one is denoted with a reference sign. The force transmission plates 38 are provided with longitudinal grooves 39 for an improved transmission of shear forces. The grooves 39 are preferably shaped sinusoidal. The transferring of forces from the spar caps 24, 25 or other laminate to the tensioning elements 13 is done by the fixing member 31 which is embedded in the spar cap material.

Figure 10:
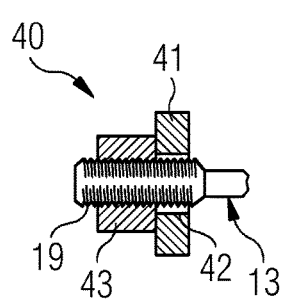
FIG. 10 shows a perspective view of a fixing device according to one embodiment.

FIG. 10 shows a fixing device 40 according to one embodiment.

The fixing device 40 comprises an insert 41 being embedded in fiber material of the first blade section 9. Preferably, the insert is made of metal. In particular, the insert 41 is placed in a blade root part of the rotor blade 5. The blade root part can be a section of the rotor blade 5 that comprises the blade root 8. The first blade section 9 can comprise the blade root part. The number of fixing devices 40 is the same as the number of tensioning elements 13. The insert 41 has a hole 42 for receiving the tensioning element 13. The fixing device 40 further comprises a removable nut 43 which engages the thread 19 of the tensioning element 13 for connecting the first blade section 9 and the second blade section 10 with each other. The nut 43 can be used to pre-stress the tensioning element 13. Internally threaded fixing members 31, i.e. carrots are placed in the second blade section 10 so that the tensioning elements 13 can be screwed directly into these. At the other end of the tensioning elements 13, i.e. in the first blade section 9 fixing nuts 43 are used to attach the tensioning members 13 to the embedded steel inserts 41. This enables the pre-tensioning of the tensioning elements 13.

Figure 11:
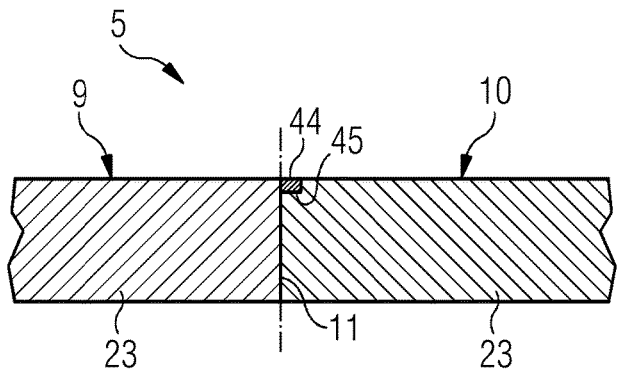
FIG. 11 shows a view of a wind turbine rotor blade according to one embodiment.

FIG. 11 shows a rotor blade 5 according to one embodiment.

FIG. 11 shows a cross-section through the shells 23 of the blade sections 9, 10. The rotor blade 5 comprises a sealing element 44 being arranged between the first blade section 9 and the second blade section 10. The first blade section 9 and/or the second blade section 10 is provided with a notch 45 for receiving the sealing element 44. The notch 45 is provided at an outside perimeter surface of the shell 23. The sealing element 44 can be placed in the notch 45 before or after connecting the blade sections 9, 10 with each other. This serves to prevent water and moisture uptake. The sealing element 44 is made of an elastomeric material.

FIG. 12 shows a block diagram of a method for mounting a rotor blade 5.

The method comprises a step S1 of providing a first blade section 9. The method also comprises a step S2 of providing a second blade section 10, wherein the rotor blade 5 is split at the interface 11 thereof in its longitudinal direction L into the first blade section 9 and the second blade section 10 and wherein the first blade section 9 is arranged closer to the blade root 8 than the second blade section 10. In a step S3, at least one tensioning element 13 for connecting the first blade section 9 and the second blade section 10 with each other is provided, wherein the length $l_{13}$ of the at least one tensioning element 13 is larger than half of the chord length $l_{22}$ of the rotor blade 5 at the interface 11. In a step S4, the first blade section 9 and the second blade section 10 are connected with each other by means of the at least one tensioning element 13, so that the at least one tensioning element 13 is charged with a tensile force for pre-stressing the at least one tensioning element 13 and so that the at least one tensioning element 13 extends deeper into the first blade section 9 than into the second blade section 10.

Although the present invention has been described in accordance with preferred embodiments, it is obvious for the person skilled in the art that modifications are possible in all embodiments.

The invention claimed is:

1. A wind turbine rotor blade comprising:
   a first blade section;
   a second blade section; and
   a plurality of pre-stressed tensioning elements for connecting the first blade section and the second blade section with each other, the plurality of pre-stressed tensioning elements arranged in indentations that are provided in spar caps of the wind turbine rotor blade, wherein the wind turbine rotor blade is split at an interface thereof in a longitudinal direction into the first blade section and the second blade section;
   wherein the first blade section is arranged closer to a root of the wind turbine rotor blade than the second blade section, further wherein a length of the at least one pre-stressed tensioning element is larger than half of a chord length of the wind turbine rotor blade at the interface;

wherein the at least one pre-stressed tensioning element extends deeper into the first blade section than into the second blade section.

2. The wind turbine rotor blade according to claim 1, wherein the length of the plurality of pre-stressed tensioning elements corresponds half times to five times the chord length.

3. The wind turbine rotor blade according to claim 1, wherein 6/10-9/10, of the length of the plurality of pre-stressed tensioning elements extends into the first blade section.

4. The wind turbine rotor blade according to claim 1, wherein the plurality of pre-stressed tensioning elements each comprise a carbon fiber reinforced material.

5. The wind turbine rotor blade according to claim 1, wherein the plurality of pre-stressed tensioning elements each comprise two fixing sections being provided at opposite ends thereof.

6. The wind turbine rotor blade according to claim 5, wherein the two fixing sections comprise external threads.

7. The wind turbine rotor blade according to claim 1, wherein the second blade section comprises a fixing member being embedded in fiber material of the second blade section and wherein plurality of pre-stressed tensioning elements engages with the fixing member for connecting the first blade section and the second blade section with each other.

8. The wind turbine rotor blade according to claim 1, wherein the first blade section comprises a fixing device with an insert being embedded in fiber material of the first blade section and a removable nut and wherein the plurality of pre-stressed tensioning elements engages with the nut for connecting the first blade section and the second blade section with each other.

9. The wind turbine rotor blade according to claim 1, comprising a sealing element being arranged between the first blade section and the second blade section.

10. The wind turbine rotor blade according to claim 9, wherein the first blade section and/or the second blade section is provided with a notch for receiving the sealing element.

11. The wind turbine rotor blade according to claim 1, wherein the plurality of pre-stressed tensioning elements is charged with a tensile force so that at the interface only compression forces act on shells of the first blade section and the second blade section.

12. The wind turbine rotor blade according to claim 1, wherein the length of the plurality of pre-stressed tensioning elements corresponds once to four times the chord length.

13. The wind turbine rotor blade according to claim 1, wherein the length of the plurality of pre-stressed tensioning elements corresponds twice to three times the chord length.

14. A method for mounting a wind turbine rotor blade, comprising the steps of:
a) providing a first blade section;
b) providing a second blade section, wherein the wind turbine rotor blade is split at an interface thereof in a longitudinal direction into the first blade section and the second blade section and wherein the first blade section is arranged closer to a root of the wind turbine rotor blade than the second blade section;
c) providing a plurality of pre-stressed tensioning elements for connecting the first blade section and the second blade section with each other, the plurality of pre-stressed tensioning elements arranged in indentations that are provided in spar caps of the wind turbine rotor blade, wherein a length of the plurality of pre-stressed tensioning elements is larger than half of a chord length of the wind turbine rotor blade at the interface; and
d) connecting the first blade section and the second blade section with each other by means of the plurality of pre-stressed tensioning elements, so that the plurality of pre-stressed tensioning elements is charged with a tensile force for pre-stressing it and so that the plurality of pre-stressed tensioning elements extends deeper into the first blade section than into the second blade section.

15. A wind turbine rotor blade comprising:
a first blade section;
a second blade section; and
at least one pre-stressed tensioning element for connecting the first blade section and the second blade section with each other, the at least one pre-stressed tensioning element is centrally arranged in a web of the wind turbine rotor blade, wherein the wind turbine rotor blade is split at an interface thereof in a longitudinal direction into the first blade section and the second blade section;
wherein the first blade section is arranged closer to a root of the wind turbine rotor blade than the second blade section, further wherein a length of the at least one pre-stressed tensioning element is larger than half of a chord length of the wind turbine rotor blade at the interface;
wherein the at least one pre-stressed tensioning element extends deeper into the first blade section than into the second blade section.

16. The wind turbine rotor blade according to claim 15, wherein the length of the at least one pre-stressed tensioning element corresponds half times to five times the chord length.

17. The wind turbine rotor blade according to claim 15, wherein 6/10-9/10 of the length of the at least one pre-stressed tensioning element extends into the first blade section.

18. The wind turbine rotor blade according to claim 15, wherein the at least one pre-stressed tensioning element comprises a carbon fiber reinforced material.

19. The wind turbine rotor blade according to claim 15, wherein the at least one pre-stressed tensioning element comprises two fixing sections being provided at opposite ends thereof.

20. A method for mounting a wind turbine rotor blade, comprising the steps of:
a) providing a first blade section;
b) providing a second blade section, wherein the wind turbine rotor blade is split at an interface thereof in a longitudinal direction into the first blade section and the second blade section and wherein the first blade section is arranged closer to a root of the wind turbine rotor blade than the second blade section;
c) providing at least one pre-stressed tensioning element for connecting the first blade section and the second blade section with each other, the at least one pre-stressed tensioning element is centrally arranged in a web of the wind turbine rotor blade, wherein the at least one pre-stressed tensioning element is larger than half of a chord length of the wind turbine rotor blade at the interface; and
d) connecting the first blade section and the second blade section with each other by means of the at least one pre-stressed tensioning element, so that the at least one pre-stressed tensioning element is charged with a tensile force for pre-stressing it and so that the at least one pre-stressed tensioning element extends deeper into the first blade section than into the second blade section.

* * * * *